United States Patent [19]
Bartlett et al.

[11] Patent Number: 5,343,523
[45] Date of Patent: Aug. 30, 1994

[54] TELEPHONE HEADSET STRUCTURE FOR REDUCING AMBIENT NOISE

[75] Inventors: Charles S. Bartlett, Clinton, Md.; Roger D. Benning, Long Valley; John B. Hunter, Basking Ridge, both of N.J.; Michael A. Zuniga, Fairfax, Va.

[73] Assignee: AT&T Bell Laboratories, Murray Hill, N.J.

[21] Appl. No.: 923,654

[22] Filed: Aug. 3, 1992

[51] Int. Cl.$^5$ .................. H04M 1/05; H04M 1/19; A61F 11/06
[52] U.S. Cl. ................................. 379/430; 379/395; 381/71; 381/72
[58] Field of Search ............... 379/433, 430, 395; 381/92, 94, 95, 83, 71, 153, 183, 72, 187, 74

[56] References Cited

U.S. PATENT DOCUMENTS

| | | | |
|---|---|---|---|
| 4,058,688 | 11/1977 | Nishimura et al. | 179/156 |
| 4,455,675 | 6/1984 | Bose et al. | 381/74 |
| 4,644,581 | 2/1987 | Sapiejewski | 381/74 |
| 4,833,719 | 5/1989 | Carme et al. | 381/72 |
| 4,985,925 | 1/1991 | Langberg et al. | 381/72 |
| 5,134,659 | 7/1992 | Moseley | 381/72 |
| 5,182,774 | 1/1993 | Bourk | 381/71 |

Primary Examiner—James L. Dwyer
Assistant Examiner—Daniel S. Hunter
Attorney, Agent, or Firm—Charles E. Graves

[57] ABSTRACT

Telephone headsets used by operators and airline pilot headsets are subject to substantial amounts of interfering ambient noise which detract from the intelligibility of incoming speech. Noise reduction circuitry does not altogether eliminate the interfering sound. A headset speaker and error microphone housing are disclosed which enable a greater amount of unwanted noise elimination. The speaker and microphone are configured closely with respect to each other and also to the user's ear. They are acoustically isolated in their own chamber. The microphone is located approximately on the speaker axis and protrudes substantially into the user's ear; and also is disposed close to the speaker cone surface. Additional acoustical tuning features include venting ports in the housing, and acoustic damping padding at the microphone entrance and on either side of the speaker. These expedients enhance the ability of the noise-cancelling circuitry to effectively reduce the undesired noise heard by the user.

10 Claims, 7 Drawing Sheets

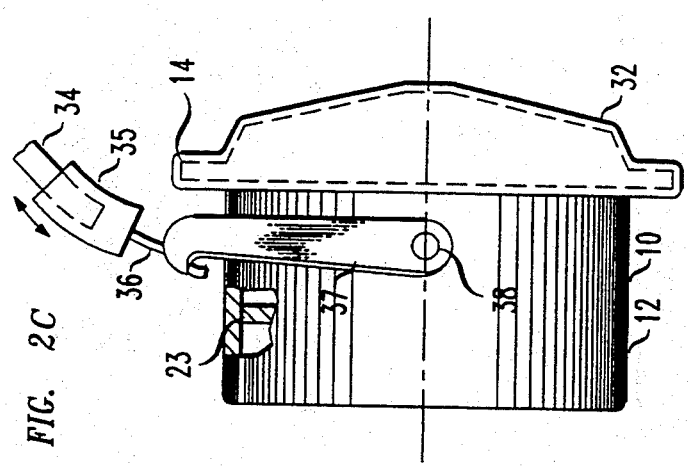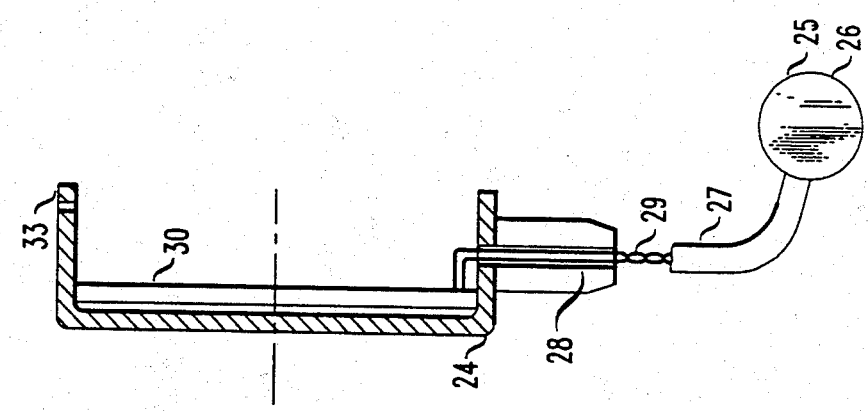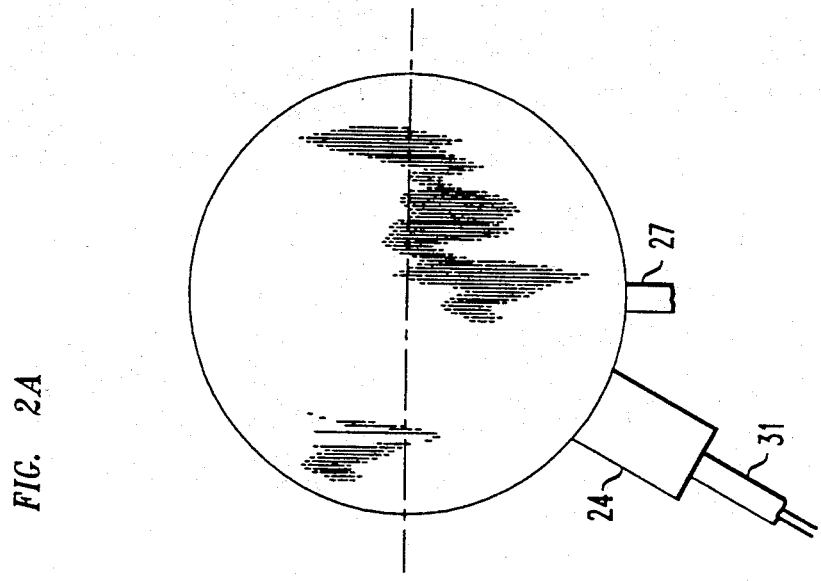

TELEPHONE HEADSET STRUCTURE FOR REDUCING AMBIENT NOISE

FIELD OF THE INVENTION

This invention relates to telephone or radio receiver headset apparatus and, more specifically, to a physical structure of such apparatus which reduces the energy of unwanted local or ambient noise in relation to the energy of the desired signal.

BACKGROUND OF THE INVENTION

Telephone headsets worn by the user and comprising one or two receiving ear pieces and a speech transmitter, have multitudes of uses including major uses as operator and airline pilot headsets. Often, however, the use location or environment contains substantial amounts of unwanted ambient noise which interferes with the intelligibility to the user of the incoming speech.

Noise suppression circuits are found in the prior headset art which reduce or cancel the undesired noise. One method is to detect the unwanted noise, convert this from an acoustic signal to an electronic replica, create an inversion thereof which is essentially 180 degrees out of phase with the ambient noise signal and play the inverted signal into the headset's receive channel which subtractively interferes with the unwanted noise signal.

The effectiveness of suppression circuits, however, is critically dependent upon a careful design of the headset housing and its interior acoustics. For example, identification and control of acoustic paths within the headset housing are important in achieving cancellation over wide bandwidths.

SUMMARY OF THE INVENTION

In accordance with the invention, the headset speaker and error microphone are configured in positions relative to each other, to the other handset components and to the ear of the user in such a way that advantageously affects the acoustical amplitude and phase coupling between these components.

The error microphone is located approximately on the speaker axis as close as practical to the speaker cone surface but not touching the speaker surface. The error microphone orientation is angled relative to the speaker axis so that its sound entry port axis is substantially perpendicular thereto. In this position the error microphone port is pointed laterally for the purpose of accepting acoustic energy from both the acoustic speaker containing incoming speech and the user's external ear cavity.

Importantly, structure is provided to locate and fix the speaker and error microphone in their own separate acoustic cavity in a headset housing at the end of the housing which is adjacent to the user's ear, with the error microphone effectively protruding into the ear canal. This expedient enables the headset noise-cancellation circuit to derive an effective noise-cancelling signal at the very point where the user perceives and experiences the noise itself, namely at the entrance to the ear.

These and other novel expedients in the structure and configuring of the headset speaker housing and associated components improve the performance of many different types of noise-cancellation and suppression circuits used in the telephone headset art and are delineated in the detailed description to follow of an illustrative embodiment.

DESCRIPTION OF THE DRAWING

FIGS. 2A, 2B and 2C are an assembly diagram of the housing and its end cap;

DETAILED DESCRIPTION OF AN ILLUSTRATIVE EMBODIMENT

Figure 3A:
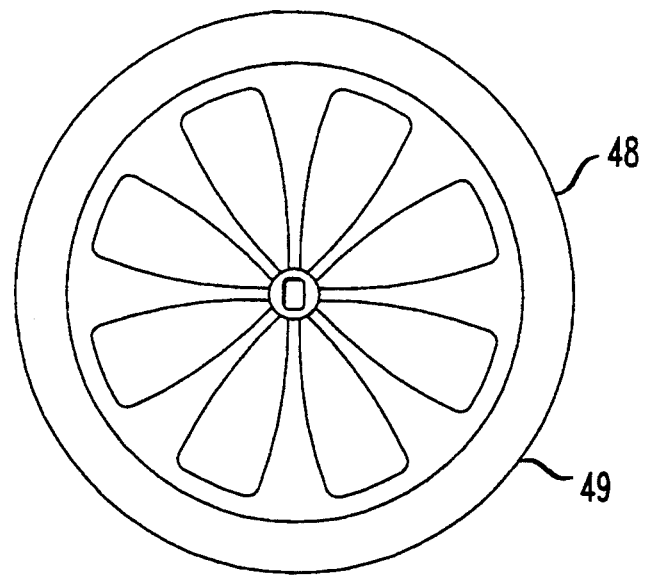
FIGS. 3A and 3B are a top and side view (the latter in section) of an error microphone and speaker support.
Figure 3B:
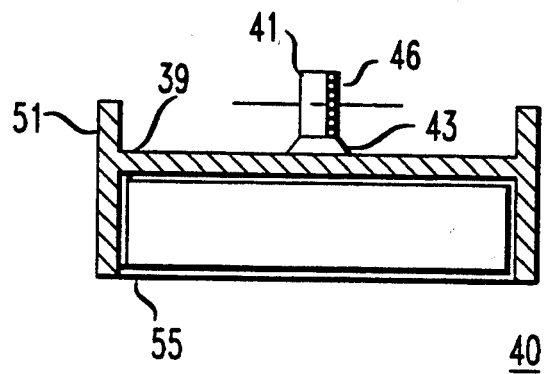

The headset housing and its associated components is illustrated beginning with FIGS. 1-3. The housing 10 contains an error microphone 41 and associated speaker denoted 55. The housing 10 has an end 11 and a cylindrical wall portion 12. A baffle 23 acoustically isolates a bottom chamber 8 within housing 10, in which the speech transmitter circuitry is located, from the top chamber 16. Advantageously, baffle 23 is relatively stiff to provide the needed acoustic isolation between the two chambers of housing 10. Material with a modulus of elasticity of essentially 250,000 or more is especially advantageous. A series of port openings 13 in wall 12 are formed in the top chamber above baffle 23. As will be discussed in detail hereinafter, the ports 13 help control the acoustic response of the speaker by providing a useful adjustment to the phase and amplitude of the noise-cancelling signal.

Housing 10 is formed with an exterior flange 14 which serves the dual purpose of providing a mount for a shaped earmuff 32 shown in FIG. 2C and also as an acoustic shunt which diverts the radiated sound from the ports 13 into a relatively longer path denoted 15 from the ports 13 to the user's ear, thus to reduce interference of this sound energy with the noise-cancellation energy.

Figure 10:
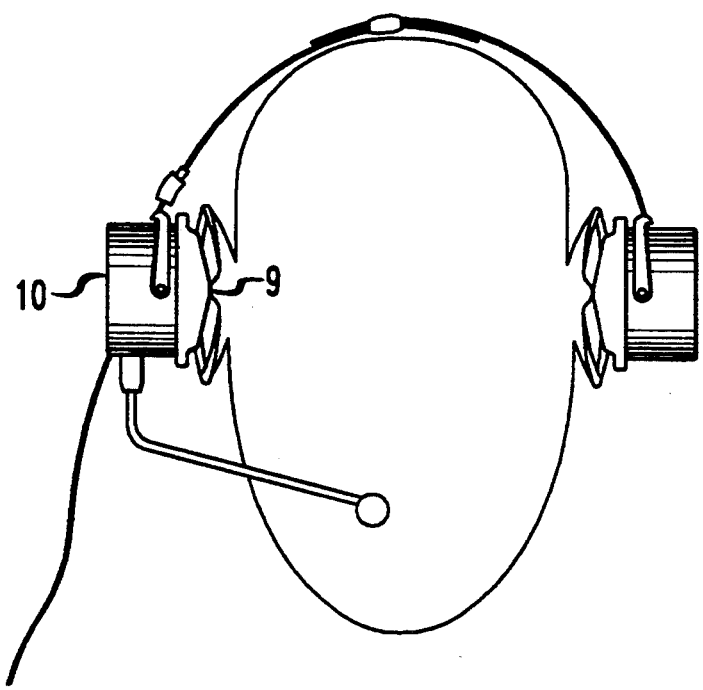
FIG. 10 is a schematic diagram of a headset configuration in which the invention is useful, shown mounted on a user.

Housing 10 is further formed with a tapered dome 17 which culminates in a projection 18. The latter has a flattened circular end 9 modeled to fit into the concha of the ear, as shown in FIG. 10. The projection 18 and its end 9 serve as a tactile form to assist the user in locating the housing 10 securely into close proximity of the ear canal. Projection 18 with its end 9 thus aids in precisely positioning the error microphone and the associated speaker with respect to the user's ear. This feature of the invention will be further described in connection with FIG. 7.

Figure 1A:
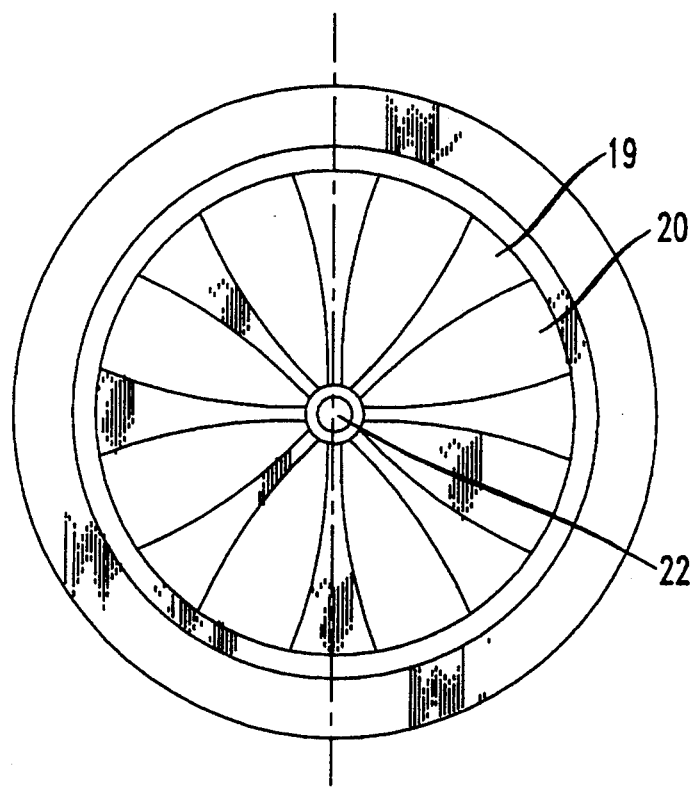
FIGS. 1A and 1B are a top and side view, the latter in partial section of a housing for a telephone headset speaker and noise suppression error microphone using the invention.

Projection 18 is formed by a series of upwardly-extending concave spokes 19, as seen in the top view of FIG. 1A. This shape for the spokes is advantageous to lend strength to the projection 18 to enable it to resist forces generated if the user forcefully mounts or adjusts the housing 10 onto the ear. The space between spokes is left open to form voids 20, which assure relatively unobstructed passage of desired speech and noise-cancelling signals from the circuit network and speaker. An opening 22 in the top of the projection 18 is formed to give the error microphone direct physical presence in the user's ear. The open "grill" formed by the spokes and voids correctly positions the headset over the pinna and concha of the user's ear. The end 9, which is the grill center, rests over and slightly within the concha cavity of the user's ear, aiding in the reception of sound energy incident upon the opening of the user's ear canal. The muff 32 is constructed of porous foam or similar material to be acoustically transparent so as not to restrict the flow of signal, noise, and noise-cancellation signal through it. In combination with the muff 32, the contoured grill thus provides a controlled acoustic venting path; and in addition the grill contour is designed to provide a comfortable fit for the user.

FIG. 2B shows the headset transmitter boom 27 and a closed-end cap 24 mountable on the exterior of wall 12. The cap interior houses speech transmitter circuit 30. Cap 24 swivel-mounts boom 27 to conventionally locate a speech transmitter 25 with respect to the user's mouth. Wires 29 connecting the transmitter 25 to the circuitry 30 are run in the interior 28 of boom 27. An acoustic muff 26 suppresses certain typical speech sounds, such as hissing, which are unwanted in the telephonic transmission. The circuitry of headset housing 10 is connected to a transmission network (not shown) through line cord 31. An access 33 provides passage for speaker wires (not shown).

As further seen in FIG. 2C, two swivels 38 (one shown) connect to the wall 12 of housing 10 to mount it to the yoke 37 of a headband 34. The yoke is attached through a pivot 36 to a support 35. The latter is slideably mounted to headband 34, the latter extending into an interior channel of the support 35. These mountings provide a needed range of adjustments to ensure not only that the headset is comfortable to the user, but also that the end 9, shown in FIG. 1, can be entered firmly and certainly into the user's ear concha during use.

Figure 4:
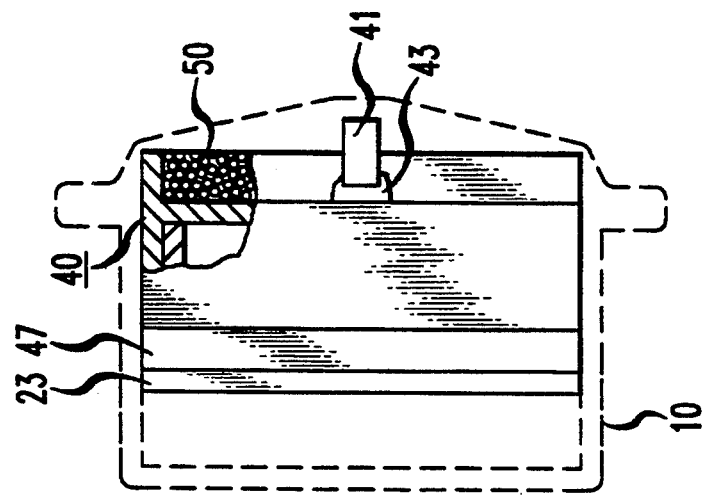
FIG. 4 is a side schematic diagram showing the assembly of the support and associated sound-shaping pads into the headset housing.

FIG. 4 shows the positioning of support frame 40 in the housing 10 and the space filled the pad 50.

Figure 1B:
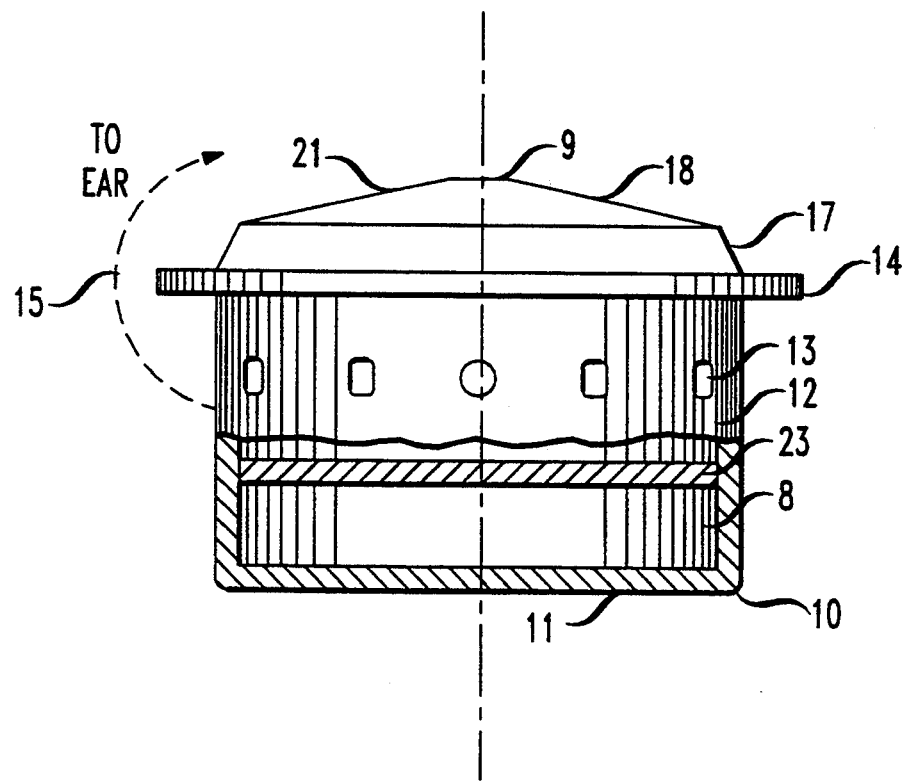
Figure 7:
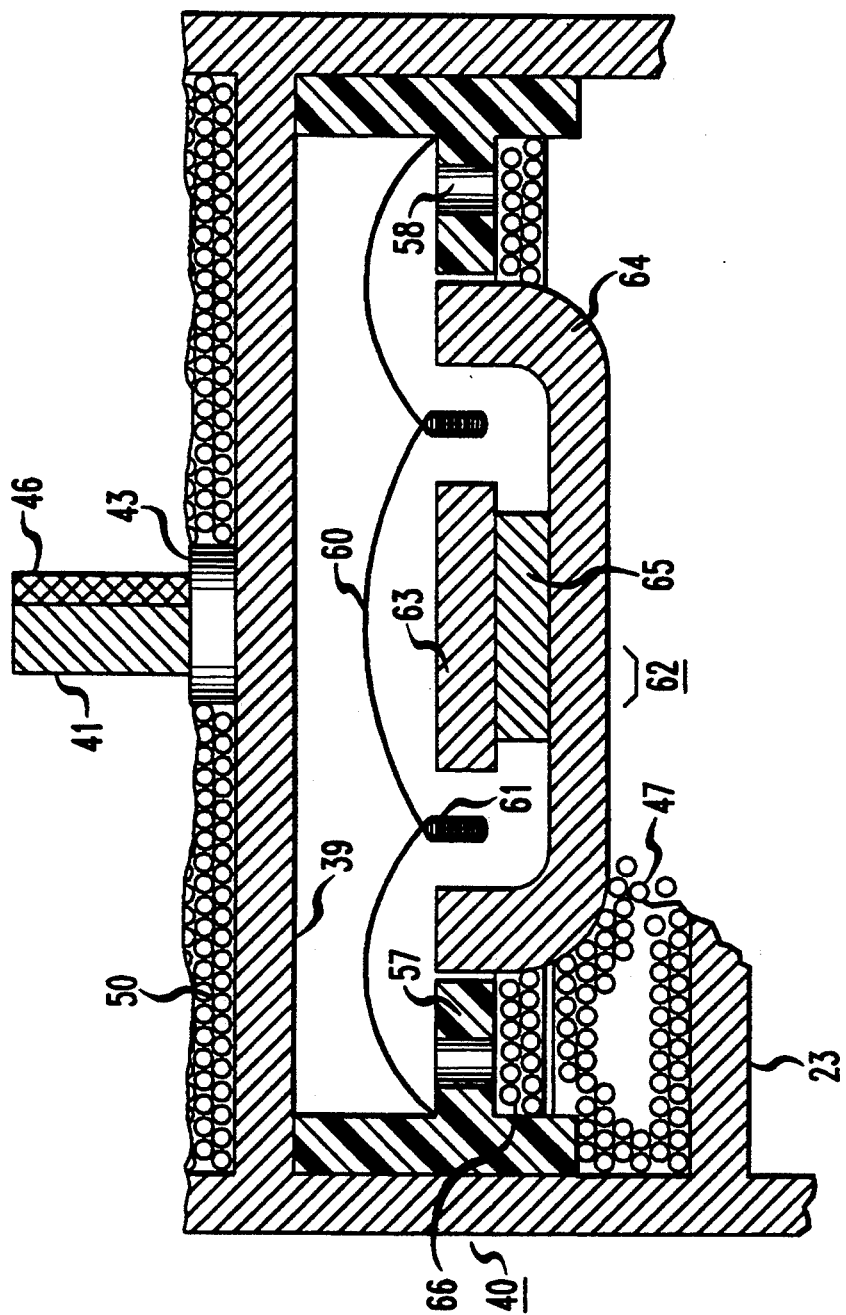
FIG. 7 is a schematic sectional side view of the speaker unit shown in greater detail.

The top chamber 16 in FIG. 1B, is located on the side of baffle 23 facing the user's ear. Top chamber 16 comprises an acoustically controlled and separate compartment for housing the speaker-error microphone assembly. Referring now to FIGS. 3 and 7, a support frame denoted 40 for the speaker-error microphone assembly is shaped as an open cylinder connected by a disc-shaped base 39. The base 39 is recessed to create shoulders 51. Base 39 carries the error microphone 41 in a position centered on the normal through pedestal 43 and the base 39. The sound entry port axis of error microphone 41 is shown as being perpendicular to the normal. A series of spokes 48 connect the pedestal 43 to the base rim. Spokes 48 are spaced to form openings 49 to acoustically access the underlying speaker 55 on the other side of base 39, as best seen in FIG. 7.

Figure 8:
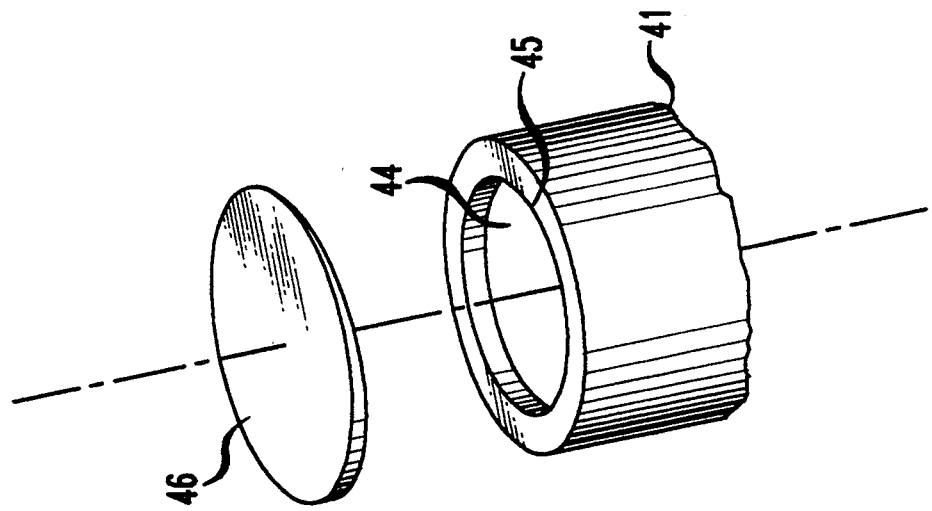
FIG. 8 is an exploded side perspective view of a preferred error microphone for use with the invention.

The error microphone 41 is of the electret type. Error microphone 41 advantageously has an omnidirectional response over a frequency range extending to a minimum of 16 kHz acoustic energy. The phase response is flat over this range to facilitate the noise-cancellation function performed by associated noise-cancelling circuitry. The error microphone 41 contains an internal electrical amplifier (not shown) which has approximately unity gain to facilitate electrical transmission of the sound pressure signal. As seen in FIG. 8, error microphone 41 advantageously comprises a cylindrical housing with the transducer diaphragm 44 recessed in a central well 45. A felt membrane 46 caps the diaphragm 44.

The acoustic response of the speaker 55 is improved by the combination of a rear enclosure consisting of the housing wall 12 and baffle 23, together with two acoustical foam paths 47, 50. The foam pad 47 behind speaker 55 and foam pad 50 in front of the speaker 55 provide damping of undesirable acoustic resonant modes and reflections emanating from the enclosure 16 and the user's ear. The pads 47, 50 advantageously are installed slightly compressed, which helps stabilize the position of speaker support 40 while at the same time providing useful frequency response shaping. Use of the front foam pad 50 provides the added benefit of reducing a high frequency response peak into a higher frequency range wherein the noise cancellation will not be adversely affected. It has also been found, however, that too much compression of the foam uses up space needed for the speaker support, and in addition, occasions poor low frequency response.

Figure 5:
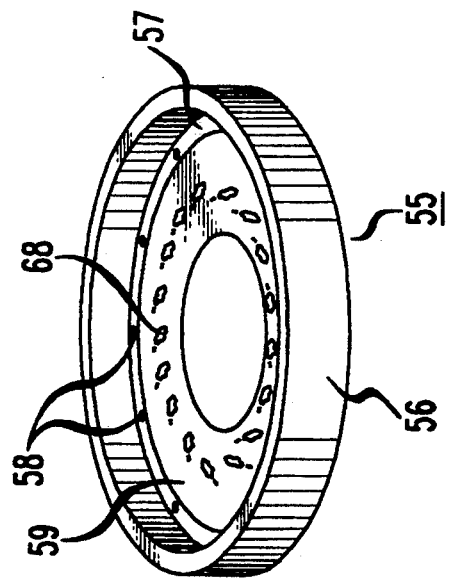
FIG. 5 is a side perspective sketch of a preferred speaker unit for use with the error microphone.
Figure 6:
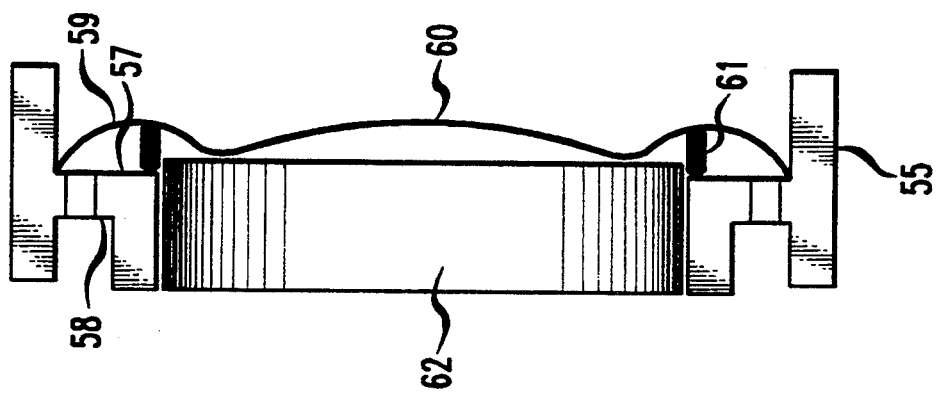
FIG. 6 is a schematic side view of the speaker unit.

Referring now to FIGS. 5, 6 and 7, the speaker type found most useful in the practice of the invention is of the moving coil variety. A specific embodiment of such a speaker consists of a frame 56 with a recessed flange 57 open at the center to accommodate a magnet assembly consisting of two pole pieces 63 and 64 and a permanent magnet 65. Several equalization ports 58 are formed in flange 57. A mylar diaphragm 59 having a center bubble section 60 is fastened along its outer perimeter to one side of flange 57. The exterior ring of diaphragm 59 is formed with corrugations denoted 68. Several equalization ports 58 are placed through the flange 57, to enhance frequency response of the speaker. A disc of felt 66 is laid on the underside of flange 57; and a disc of foam material denoted 50 is laid over base 39 to control resonance. The coil wire 61 forming the moving coil armature of the speaker is fastened around the lateral sides of the bubble 60, the wire coil extending into the gap between the magnet pole pieces 63, 64. The overall magnet assembly 62 is mounted on flange 57 40.

Figure 9:
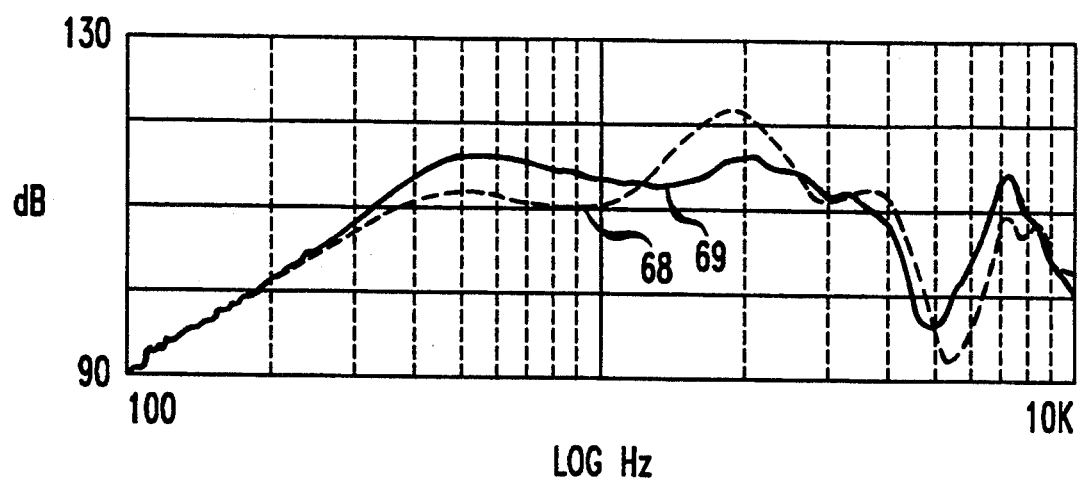
FIG. 9 is a graph demonstrating the relative improvement in frequency response gained by use of venting ports in the housing.

Returning to the description of housing ports 13, FIG. 9 shows that the frequency response curve of a selected noise-suppression circuit may be improved by using several of the ports 13 rather than no ports. The dotted trace denoted 68 is a measure of the frequency response of the apparatus when housing 10 has solid walls with no ports 13. The solid trace denoted 69 was taken using a housing with ten ports evenly spaced along wall 12. It is seen that frequency response with the ports added is substantially and advantageously flattened. The frequency response curve is increased in the 500 to 1200 Hz region. Further, the ports in combination with the foam pads 47 and 50, reduce resonances in the 1500 to 2500 Hz region. It also has been found that use of substantially more ports 13 on the specific embodiment shown can detract from performance.

We claim:

1. In a telephonic headset comprising a speech transmitter, at least one speech-receiving ear-mounted speaker and an error microphone including a directional port for receiving ambient noise, the improvement comprising:

a substantially cylindrical housing for mounting said error microphone and said speaker, said housing comprising a bottom chamber a top chamber separated by a baffle from said lower chamber and comprising a cylindrical wall, a plurality of port openings in said wall, an exterior flange encircling said top chamber above said ports;

a domed extension of said top chamber rising above said flange, said extension comprising a plurality of spokes, the space between said spokes defining voids for passing of desired speech and noise-cancelling signals;

a flattened platform in the center of said dome having an opening for exposing said error microphone into direct physical presence in the user's ear; and means for mounting said speaker and error microphone in said top chamber such that said directional port of said microphone is aligned substantially perpendicular to the axis of propagation of said speaker.

2. Apparatus in accordance with claim 1, wherein said spokes are contoured with an inwardly-directed concavity.

3. Apparatus in accordance with claim 2, further comprising a porous muff fitting snugly around said dome and elastically gripping the underside of said flange.

4. Apparatus in accordance with claim 3, wherein mounting means further comprises:

a cylindrical frame disposed in said top chamber of said housing, said frame comprising a recessed base extending across a first interior end of said frame, means for mounting said error microphone in a position on said base centered on the normal through said member, and a chamber for containing said speaker, said chamber defined by the opposite side of said base and the interior of said frame.

5. Apparatus in accordance with claim 4, wherein said base comprises a plurality of spaced spokes defining acoustic openings to said speaker.

6. Apparatus in accordance with claim 5, wherein said error microphone comprises an electret component and a sound entry port acoustically accessing said electret component; and said error microphone mounting means comprises means for orienting said error microphone relative to the speaker axis so that said sound entry port axis is substantially perpendicular thereto.

7. Apparatus in accordance with claim 6, further comprising a felt membrane capping said sound entry port.

8. Apparatus in accordance with claim 7, further comprising a first compliant means disposed behind said speaker, and a second compliant means disposed atop said spaced spokes of said base for providing damping of undesirable acoustic resonant modes.

9. Apparatus in accordance with claim 8, wherein said second compliant means comprises a felt pad; and wherein said first compliant means is compressed in its installed position.

10. Apparatus in accordance with claim 9, wherein said baffle comprises relatively stiff material having a modulus of elasticity of essentially 250,000 or more.

* * * * *